Figure 1:
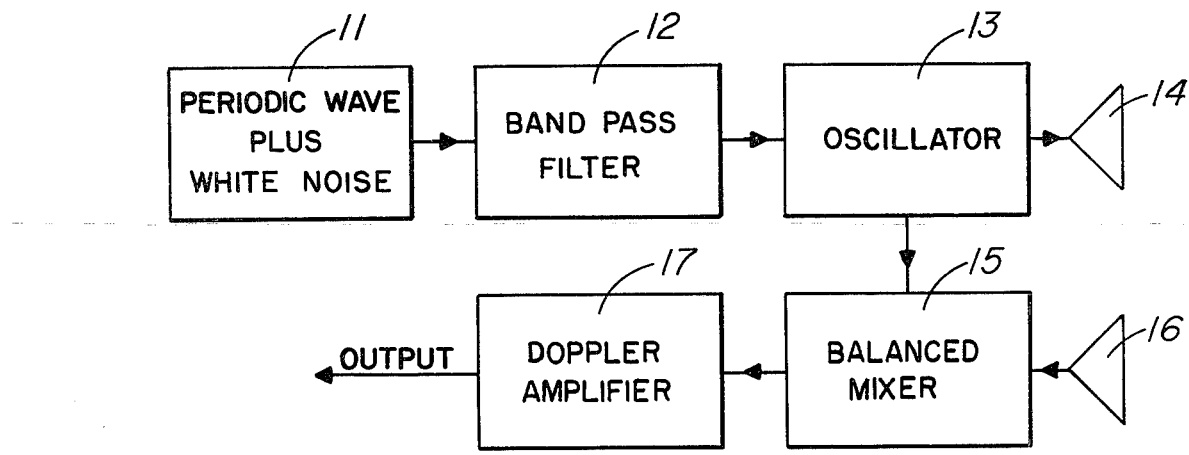

United States Patent [19]

Adrian

[11] 4,232,314
[45] Nov. 4, 1980

[54] FM AUTOCORRELATION FUZE SYSTEM

[75] Inventor: Donald J. Adrian, Arlington, Calif.

[73] Assignee: The United States of America as Represented by the Secretary of the Navy, Washington, D.C.

[21] Appl. No.: 770,236

[22] Filed: Oct. 28, 1958

[51] Int. Cl.³ .................. G01S 13/34; F42C 13/04
[52] U.S. Cl. .................. 343/7 PF; 102/214
[58] Field of Search .................. 343/7, 14, 172, 14, 343/7 PF; 102/70.2 P, 214

[56] References Cited

U.S. PATENT DOCUMENTS

| | | | |
|---|---|---|---|
| 2,760,188 | 8/1956 | Guanella et al. | 343/7 PF |
| 2,825,056 | 2/1958 | Rust | 343/14 |
| 2,842,764 | 7/1958 | Harvey | 343/7 PF |
| 2,911,639 | 11/1959 | Hopkins | 343/7 PF |
| 2,958,862 | 11/1960 | Rey | 343/14 |

Primary Examiner—Malcolm F. Hubler
Attorney, Agent, or Firm—Richard S. Sciascia; Joseph M. St. Amand

EXEMPLARY CLAIM

1. An FM doppler fuze system comprising means for combining a periodic wave with white noise, white noise being a random mixture of frequencies possessing a constant power spectral density, means for modulating a carrier frequency with said periodic wave plus noise and transmitting a signal in the direction of a target, means for mixing a portion of said transmitted signal and a return echo signal from a target, and means for passing the band of expected doppler frequencies from the output of said mixer to provide an output operable to actuate the detonation circuit of a fuze.

6 Claims, 2 Drawing Figures

FM AUTOCORRELATION FUZE SYSTEM

The invention described herein may be manufactured and used by or for the Government of the United States of America for governmental purposes without the payment of any royalties thereon or therefor.

This invention relates to a fuze system and more particularly to an FM Autocorrelation Fuze System Using Noise Plus Periodic Modulation to provide a more rapid and unambiguous range cut-off.

In this type of frequency modulated doppler fuze system, a sinusoidal frequency modulation has been previously utilized to give some range attenuation but the cut-off is very poor and ambiguous due to the periodic modulation. In sinusoidal frequency modulation the range cut-off is very poor (i.e. there is not much reduction in the wave peaks) and ambiguous (i.e. there are several peaks) caused by periodic modulation. In the co-pending application of Whiteley and Adrian for a Fuze System, Ser. No. 566,318, filed Feb. 17, 1956, a fuze system is disclosed which provides a rapid unambiguous range cut-off by frequency modulating the transmitted carrier frequency by band limited random noise; also, sinusoidal modulation is discussed and illustrated. Another fuze system using triangular waveforms for modulating a carrier is disclosed in the co-pending application of Adrian and Whiteley, Ser. No. 770,234, filed Oct. 28, 1958.

The fuze system of the present invention provides an even sharper cut-off by utilizing a periodic wave plus white noise for frequency modulating a carrier signal. The term "white noise" is well known. The origin of the term "white noise" goes back to white light which is a mixture of all colors (or frequencies) in equal amounts; it is discussed in several texts, and, for example, "Random Processes in Automatic Control" by Laning and Battin, McGraw-Hill 1956, page 142, refers to "white noise" as a random process possessing a constant power spectral density. In the present system, a periodic wave which may be a sine wave, a triangular wave or any other suitable waveform having a periodic repetition is modified by a band of white noise at random frequencies which is passed through a band pass filter and applied to an oscillator for frequency modulating the carrier signal which is transmitted in the direction of the target. A portion of the transmitted signal is mixed with the return signal received from the target, the latter being phase modulated by doppler effect of the movement between the target and the fuze which may be located in a missile, these signals are mixed in a balanced mixer which provides the autocorrelation function of the power spectrum and the output is applied to a doppler amplifier which raises the signal level to provide an output which is adequate to actuate the detonation circuit of the fuze. If desired, a fixed delay may be inserted between the oscillator and mixer to make the fuze signal peak at a prescribed range.

One object of the present invention is to provide a fuze system having a sharper and unambiguous range cut-off.

Another object of the present invention is to provide a doppler fuzing system which utilizes a combination of noise plus periodic modulation with autocorrelation of the transmitted and received signals to provide an even sharper range cut-off.

A still further object of the present invention is to provide a fuzing system which can be utilized in close proximity to a surface such as the ocean without receiving spurious signals which will trigger the fuze prematurely.

Figure 2:
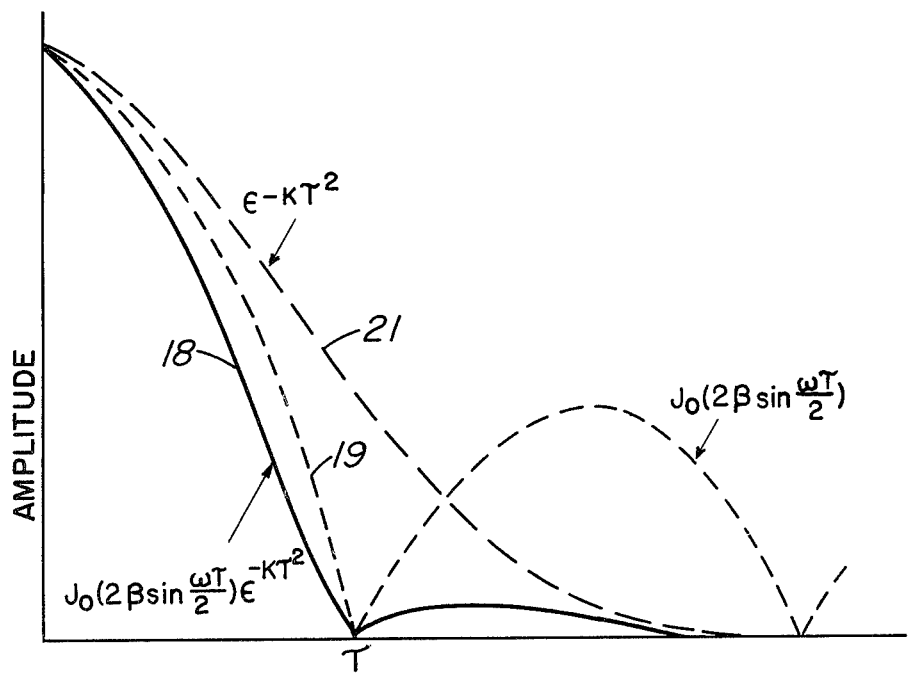

Other objects and many of the attendant advantages of this invention will be readily appreciated as the same becomes better understood by reference to the following detailed description when considered in connection with the accompanying drawings wherein:

FIG. 1 is a block diagram illustrating one preferred embodiment of the present invention; and FIG. 2 is a diagram illustrating the relative amplitude of the response with respect to range of the present system utilizing noise plus periodic modulation as compared to the previous systems utilizing sinusoidal or noise modulation alone.

Referring now to the drawings in detail, one preferred embodiment of the present invention is shown in block diagram form in FIG. 1. The fuze is assumed to be mounted in a moving missile which is guided in a path to approach the target with the r—f energy from the fuze being transmitted toward the target and a return echo signal being received therefrom. In the block 11, a periodic wave of any desired form such as a triangular wave or sine wave is modified by a band of white noise which is passed through the band pass filter 12 and is used to frequency modulate the oscillator 13, which transmits a frequency modulated r—f carrier signal in the direction of the target through the antenna 14. A portion of the transmitted energy is also applied to the balanced mixer 15 where it is combined with the return signal from the target aircraft which has been modified by the doppler effect of the relative movement between the missile and aircraft and is received through the antenna 16 and applied to the balanced mixer or cosine law mixer 15.

In block 11, periodic sine waves may be produced by means of an oscillator, periodic square waves may be produced by a multivibrator or by clipping of sine waves, or triangular waves produced by integrating a square wave using a simple R-C circuit, all of which are well known means of producing periodic waves. The white noise may also be produced in a number of well known ways, such as by amplification of vacuum tube noise, resistor noise, transistor noise, etc.. The summation of a periodic wave and white noise in block 11 may be done in a number of known ways which includes inserting both waves into a common resistor, resulting in a periodic wave plus noise frequency modulated signal.

The output from the balanced mixer 15 is passed through a doppler amplifier 17 which is set to pass and amplify all of the expected doppler frequencies. The output signal from the doppler amplifier 17 is proportional to the autocorrelation function of the modulated input and will be a doppler wave having an envelope or range function of a form corresponding to the product of the range functions of the periodic wave and the noise which in the case of a sine wave plus white noise would be of the form shown in FIG. 2 by the solid line 18.

This output would go to the detonation circuit of the fuze (not shown) and when it reaches a suitable level on the relative amplitude curve of FIG. 2 would fire the detonation circuit to explode the warhead (not shown).

If desired, a fixed delay (not shown) could be inserted between the oscillator 13 and the balanced mixer 15 to make the fuze signal peak at a prescribed range. Obviously, one antenna could be used for both transmitting and receiving but the system illustrated using separate antennas is preferred.

The explicit theory which explains the operation of the Random FM Correlation Fuze System noted supra is explained in detail therein and applies generally with respect to the noise portion of the modulation in the present invention. The range function or the envelope of the doppler wave output from the doppler amplifier 17, due to noise plus periodic modulation, is the product of the range functions due to noise modulation alone and due to periodic modulation alone. An example of the type of range function obtainable with the present invention is shown in the waveforms of FIG. 2. The range function for sinusoidal modulation is $$J_o(2\beta \sin \omega\tau/2)$$

where $\beta$ is the modulation index, $\omega$ is the modulation frequency, $\tau$ is the time for the signal to travel to the target and back, as illustrated in the dotted line curve 19. The range function for noise modulation alone is $$e^{-k\tau^2}$$

as illustrated in the dashed line 21 of FIG. 2.

The system of the present invention will give the product of the two which is $$J_o(2\beta \sin \omega\tau/2)e^{-k\tau^2}$$

as illustrated in the solid line 18 of FIG. 2.

It will be apparent that the fuze system of the present invention will give a much sharper range cut-off than either of the systems using sine wave modulation or noise modulation alone and has very little ambiguity and an extremely low level in the secondary peaks as compared to the ambiguity of the sine wave itself.

A similar system using a periodic triangular waveform plus noise, being either symmetrical or sawtooth as disclosed in the co-pending application mentioned supra, would provide comparable results with even sharper cut-off and lower secondary peaks.

If desired the noise may be passed through the band pass filter 12 prior to combining the noise signal with the periodic wave since the purpose and function in either case is to limit the band of noise frequencies passed.

Obviously many modifications and variations of the present invention are possible in the light of the above teachings. It is therefor to be understood that within the scope of the appended claims the invention may be practiced otherwise than as specifically described.

What is claimed is:

1. An FM doppler fuze system comprising means for combining a periodic wave with white noise, white noise being a random mixture of frequencies possessing a constant power spectral density, means for modulating a carrier frequency with said periodic wave plus noise and transmitting a signal in the direction of a target, means for mixing a portion of said transmitted signal and a return echo signal from a target, and means for passing the band of expected doppler frequencies from the output of said mixer to provide an output operable to actuate the detonation circuit of a fuze.

2. An FM doppler fuze system comprising means for combining a periodic sine wave with white noise, white noise being a random mixture of frequencies possessing a constant power spectral density, means for modulating a carrier frequency with said periodic wave plus noise and transmitting a signal in the direction of a target, means for mixing a portion of said transmitted signal and a return echo signal from a target, and means for passing the band of expected doppler frequencies from the output of said mixer to provide an output operable to actuate the detonation circuit of a fuze.

3. An FM doppler fuze system comprising means for combining a periodic triangular wave with white noise, white noise being a random mixture of frequencies possessing a constant power spectral density, means for modulating a carrier frequency with said periodic wave plus noise and transmitting a signal in the direction of a target, means for mixing a portion of said transmitted signal and a return echo signal from a target, and means for passing the band of expected doppler frequencies from the output of said mixer to provide an output operable to actuate the detonation circuit of a fuze.

4. An FM doppler fuze system comprising means for combining a periodic wave with white noise, white noise being a random mixture of frequencies possessing a constant power spectral density, means including a band pass filter for limiting the band of noise frequencies, means for modulating a carrier frequency with said periodic wave plus noise and transmitting a signal in the direction of a target, means including a balanced mixer receiving a portion of said transmitted signal and a return echo signal from a target, and means including a doppler amplifier for passing the band of expected doppler frequencies from the output of said mixer to provide an output operable to actuate the detonation circuit of a fuze, wherein the combination of periodic wave plus white noise for modulation with autocorrelation of transmitted and received signals provides sharper range cut-off.

5. An FM doppler fuze system comprising means for combining a periodic sine wave with white noise, white noise being a random mixture of frequencies possessing a constant power spectral density, means including a band pass filter for limiting the band of noise frequencies, means for modulating a carrier frequency with said periodic wave plus noise and transmitting a signal in the direction of a target, means including a balanced mixer receiving a portion of said transmitted signal and a return echo signal from a target, and means including a doppler amplifier for passing the band of expected doppler frequencies from the output of said mixer to provide an output operable to actuate the detonation circuit of a fuze.

6. An FM doppler fuze system comprising means for combining a periodic triangular wave with white noise, white noise being a random mixture of frequencies possessing a constant power spectral density, means including a band pass filter for limiting the band of noise frequencies, means for modulating a carrier frequency with said periodic wave plus noise and transmitting a signal in the direction of a target, means including a balanced mixer receiving a portion of said transmitted signal and a return echo signal from a target, and means including a doppler amplifier for passing the band of expected doppler frequencies from the output of said mixer to provide an output operable to actuate the detonation circuit of a fuze.

* * * * *